United States Patent [19]

Yu

[11] Patent Number: 5,434,621
[45] Date of Patent: Jul. 18, 1995

[54] OBJECT TRACKING METHOD FOR AUTOMATIC ZOOMING AND THE APPARATUS THEREFOR

[75] Inventor: Kyeong-su Yu, Suwon, Rep. of Korea

[73] Assignee: Samsung Electronics Co., Ltd., Kyungki, Rep. of Korea

[21] Appl. No.: 134,833

[22] Filed: Oct. 12, 1993

[30] Foreign Application Priority Data

Oct. 9, 1992 [KR] Rep. of Korea ............... 92-18552
Sep. 16, 1993 [KR] Rep. of Korea ............... 93-18663

[51] Int. Cl.6 ........................................... H04N 5/232
[52] U.S. Cl. .......................................... 348/347; 348/345; 348/358; 348/361; 354/402
[58] Field of Search ............... 348/345, 347, 358, 354; 354/402

[56] References Cited

U.S. PATENT DOCUMENTS 4,991,944  2/1991  Hirao et al. .................. 350/429
5,113,214  5/1992  Nagata et al. ................. 348/347
5,287,223  2/1994  Hirasawa ...................... 348/345

OTHER PUBLICATIONS

"Novel Technologies for Automatic Focusing and White Balancing of Solid State Color Video Camera" by K. Harna et al.

Primary Examiner—Joseph Mancuso
Assistant Examiner—Andrew B. Christensen
Attorney, Agent, or Firm—Sughrue, Mion, Zinn, Macpeak & Seas

[57] ABSTRACT

An object tracking apparatus for an automatic zoom lens control in a video camera includes a memory for storing data for zoom track lines showing the relationship between the distance variation of a zoom lens and the distance variation of a focus lens while the distance of an object is kept constant, a zoom encoder for producing a zoom position signal showing the zoom lens position, a microcomputer for detecting the variation amount of the zooming position, and a zoom motor for variably controlling the zoom lens position corresponding to the detected zoom speed. A corresponding method for automatic object tracking using a zoom lens is also described.

4 Claims, 5 Drawing Sheets

FIG. 6

OBJECT TRACKING METHOD FOR AUTOMATIC ZOOMING AND THE APPARATUS THEREFOR

FIELD OF THE INVENTION

The present invention relates to an object tracking method for automatic zooming and the apparatus therefor in cameras and, more specifically, to an object tracking method for maintaining a constant angle of view by adjusting the movement direction and speed variation of a lens system to compensate for movement of an object or by a photographer using a camcorder. An apparatus adapted to perform the object tracking method is also disclosed.

Korean Patent Application Nos. 92-18552 and 93-18663 are incorporated herein by reference for all purposes.

BACKGROUND OF THE INVENTION

Generally, a video camera includes a zoom lens for zooming. In a conventional system, the position of the zoom lens is varied by a zoom motor to perform a variable picture enlargement function. To simplify the driving circuit of the zoom motor, the zoom motor is usually driven at a predetermined constant velocity.

Focusing system for the zoom lens of a video camera, including a system wherein an inner focusing system uses a luminance signal and a system wherein a front focusing system uses a infrared beam, are known to provide means for the adjusting focus of a camera.

Figure 1:
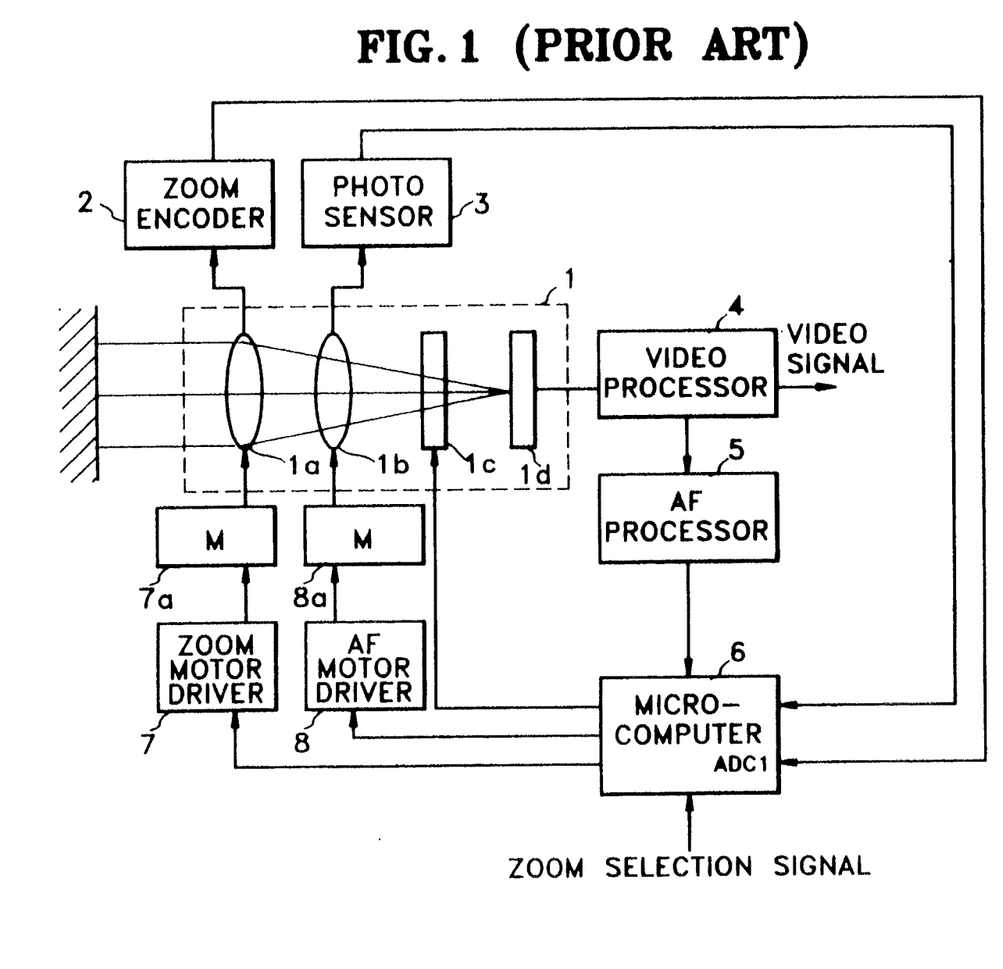
FIG. 1 is a block diagram of a portion of a convential video camera.

FIG. 1 is a block diagram useful in explaining the operation and configuration of a video camera employing a conventional inner focusing system. In FIG. 1, optical information regarding the object to be photographed is passed through a zoom lens 1a and a focus lens 1b to a charged coupled device (CCD) 1d, via an iris 1c, which CCD produces an electrical signal. The electrical signal is output as a video signal via a video processor 4.

A position signal of zoom lens 1a (hereinafter referred to as a zoom position signal) detected by a zoom encoder 2 indicates the position of zoom lens 1a. The zoom position signal is digitized by an analog-to-digital (A/D) converter incorporated in a microcomputer 6.

Meanwhile, an automatic focusing (AF) processor 5 detects an AF evaluation value, using the high-band component of a luminance signal of the output signals of video processor 4. A photosensor 3 is commonly employed when an AF motor 8a is a stepping motor to discern the center position of the stepping motor, that is, the center position for focus lens 1b. Photosensor 3 drives AF motor 8a when the system initializes, e.g., when the power is turned on, and locates focus lens 1b on the distance center thereof so that the center of focus lens 1b is sensed to perform the AF function.

Microcomputer 6 outputs a drive signal to an AF motor driving circuit 8 by using the AF evaluation value output from AF processor 5, so as to focus at the maximum AF evaluation point. Furthermore, the microcomputer outputs a drive signal to a zoom motor driving circuit 7 to shift the zoom lens 1a to a zooming position corresponding to a zoom selection signal set by a user.

When zoom motor driving circuit 7 drives a zoom motor 7a using the drive signal, microcomputer 6 decides whether a zoom position has been selected by a user, by a zoom position signal output from zoom encoder 2, to control the zooming operation.

However, in order to keep the viewed size of an object constant with respect to the screen in such a system, i.e., to maintain a constant viewing angle, when the object to be photographed moves forward and backward or a photographer moves forward and backward with respect to the object, the zooming operation is controlled at a fixed zooming velocity using a zoom-in/zoom-out selection key. Since the zooming operation is performed at a predetermined velocity regardless of the velocity at which the object or photographer moves, it is difficult to maintain a constant object size as viewed on the screen. Furthermore, since the zoom-in/zoom-out selection key is manually operated, the skillful use of the zoom lens is rather difficult for novice photographers.

A zoom driving apparatus which does not destroy an in-focus state during the zooming operation is disclosed in U.S. Pat. No. 4,991,944, which is incorporated herein by reference for all purposes. In the apparatus, in order to perform the zooming operation, a photographer must manually operate a zoom switch in an intended direction, and the zooming velocity cannot be varied adaptively with respect to variations of the object within the screen, so that the object cannot be photographed with a fixed size on the screen.

SUMMARY OF THE INVENTION

Therefore, it is an object of the present invention to provide an object tracking method for automatic zooming for a video camera which varies the zooming velocity while being adaptive to the movement direction and speed change caused by movement of an object or a photographer, so as to keep a fixed viewing angle and allow the photographer to photograph the object with a desired size on the screen.

It is another object of the present invention to provide an object tracking apparatus for automatic zooming which performs the above method.

To accomplish the first object, an object tracking method for automatic zooming in a video camera having a zooming function, comprises the steps of:

reading out data for a plurality of zoom track lines, each of the track lines showing the relationship between distance variation of a zoom lens and distance variation of a focus lens corresponding to a constant object distance;

detecting a zoom position signal showing zoom lens position;

determining variation amount of the zoom lens position corresponding to distance variation of an object, using the data read out from the data for the zoom track lines during the reading step and the zoom position signal produced during the detecting step; and variably adjusting the zoom lens position corresponding to determined zoom speed.

These an other objects, features and advantage of the present invention are provided by an object tracking apparatus for automatic zooming in a video camera having a zooming function, comprising:

a memory for storing data for a plurality of zoom track lines, each of the lines showing the relationship between distance variation of a zoom lens and distance variation of a focus lens while an object distance is kept constant;

a zoom position detector for producing a zoom position signal showing zoom lens position;

a zoom speed detector for detecting the variation amount of zooming position corresponding to the distance variation of the object, using the data stored in the memory and the zoom position signal; and a zoom driving circuit for variably controlling the zoom lens position corresponding to the output of the zoom speed detector.

According to one aspect of the invention, an automatic focusing (AF) control function for detecting an AF evaluation value using a value in which a focusing area corresponding to the distance variation of a photographed object is integrated for a predetermined field period is used to control the automatic focusing, is provided by an AF processor.

According to yet another aspect of the invention, each of the zoom track lines advantageously can correspond to both a constant distance and an associated drive signal magnitude. Accordingly, when the focusing lens position shifts from one zoom track line to another, the position of the zoom lens and the position of the AF lens will be maintained according to the zoom track line and can be driven at a zoom driving speed corresponding to the selected zoom track line.

These and other objects, features and advantages of the invention are disclosed in or apparent from the following description of preferred embodiments.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE INVENTION

Figure 2:
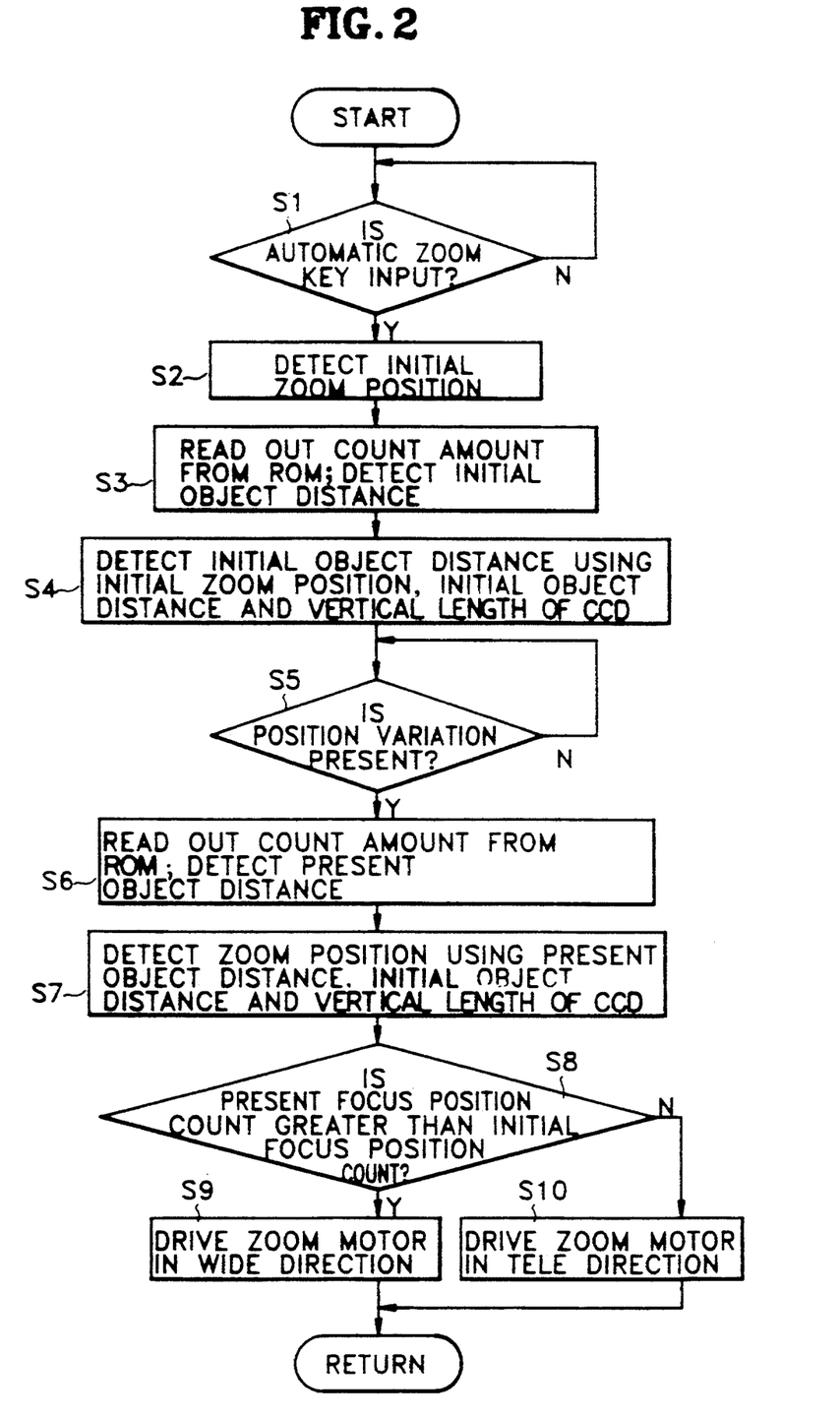
FIG. 2 is a flowchart of one embodiment of an object tracking method for automatic zooming according to the present invention.

FIG. 2 is a flowchart of one embodiment of an object tracking method for automatic zooming according to the present invention, which includes steps for setting an automatic zooming mode (S1), for detecting a zooming position (S2–S4), for detecting the distance variation of an object (S5), for detecting the variation amount of zooming (S6–S7) and for controlling a zooming operation (S8–S10).

Prior to discussing each of these steps, a description of an exemplary apparatus for carrying out the method will be described.

Figure 3:
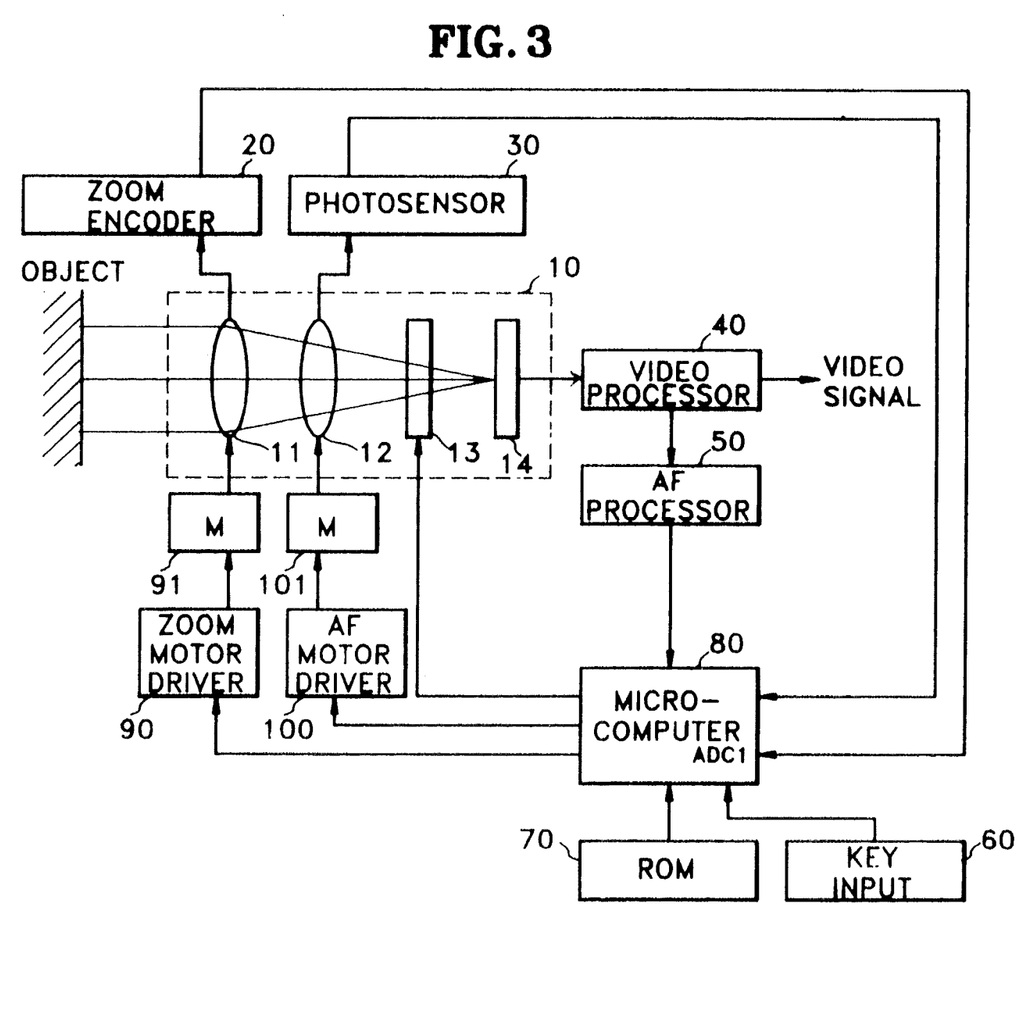
FIG. 3 is a block diagram of an apparatus for performing the flowchart shown in FIG. 2.

FIG. 3 illustrates an object tracking apparatus for automatic zooming according to a preferred embodiment of the present invention. The apparatus includes a lens portion 10 which incorporates a zoom lens 11 for variably enlarging a picture, a focus lens 12 for controlling focus, an iris 13 for controlling the amount of light transmitted through the focus lens 12, and a CCD 14 for converting the light signal passing through the iris 13 into an electric signal. Preferably, the object tracking apparatus comprises a zoom encoder 20 for producing a zoom position signal which indicates the position of zoom lens 11 and a photosensor 30 located on the center of the maximum range within which the position (referred to as focus position) of focus lens 12 can be varied for detecting the current center position of focus lens 12. A video processor 40 allowing processing of the electrical signal output from CCD 14 in a known manner to produce a video signal, e.g., an NTSC video signal. Video processor 40 advantageously proves a signal to an AF processor 50, which A/D-converts the high-band component of the luminance signal of the video signal output from video processor 40 for detecting an AF evaluation value using a value in which a focus zone corresponding to the situation of an object is integrated for a predetermined period, e.g., one field. Additional details regarding the AF evaluation value may be found in e.g., U.S. Pat. No. 4,991,944.

The apparatus shown in FIG. 3 preferably includes a key input 60 having an automatic zoom key for setting an automatic zooming mode, a ROM 70 for storing data for a plurality of zoom track lines, each of which shows the distance variation of focus lens 12 according to the distance variation of zoom lens 11 while the distance of an object is kept constant, a microcomputer 80 operative when the automatic zoom key is pressed, producing a first drive signal for driving a zoom motor 91 using the data stored in ROM 70 and corresponding to the variation amount of the object so as to vary the position of zoom lens 11, and producing a second drive signal for driving an AF motor 101 so as to detect the maximum AF evaluation value output from AF processor 50, a zoom motor driving circuit 90 for driving zoom motor 91 for controlling the displacement amount of zoom lens 11 according to the first drive signal output from microcomputer 80, and an AF motor driving circuit 100 for driving AF motor 101 for controlling the displacement amount of focus lens 12 according to the second drive signal output from microcomputer 80.

It should be noted that when the position of the object varies, AF processor 50 obtains an AF evaluation value, i.e., a correct focus value, using a signal provided by video processor 40. Then, microcomputer 80 reads information on a constant distance and a motor drive signal corresponding to the correct focal distance from ROM 70. Accordingly, microcomputer 80 controls both motor drivers, as well as respective zoom motor 91 and AF motor 101, so that zoom lens 11 and focus lens 12 are controlled with respect to the data stored in ROM 70, which data corresponds to the zoom track lines of FIG. 4.

Now, the flowchart of FIG. 2 will be described below with reference to FIG. 3.

In FIG. 2, when an object is being photographed at an intended viewing angle and it is desired to maintain such a state, a check is made to determine whether the automatic zoom key is pressed during step S1. The automatic zoom key advantageously can be separately provided from the zoom-in/zoom-out selection key. The automatic zooming operation of the present invention may further be performed by an automatic mode setting key as well.

During step S2, a zoom position signal (hereinafter referred to as an initial zoom position signal) is output from zoom encoder 20 when the automatic zoom key is input, which thereby optimizes the focusing. Preferably, the initial zoom position signal is converted into digital form using an A/D converter internal to microcomputer 80. It should be noted that when zoom encoder 20 includes variable resistors, the initial zoom position signal output by zoom encoder 20 takes the form of a voltage signal. Advantageously, the initial focal length $f_0$ of the zoom lens can be determined from the initial zoom position signal.

During step S3, the counted value of AF motor 101, which corresponds to an optimal focus position according to the initial zoom position is read out from ROM 70 to thereby specify the distance of an object (hereinafter referred to as the object distance).

Figure 4:
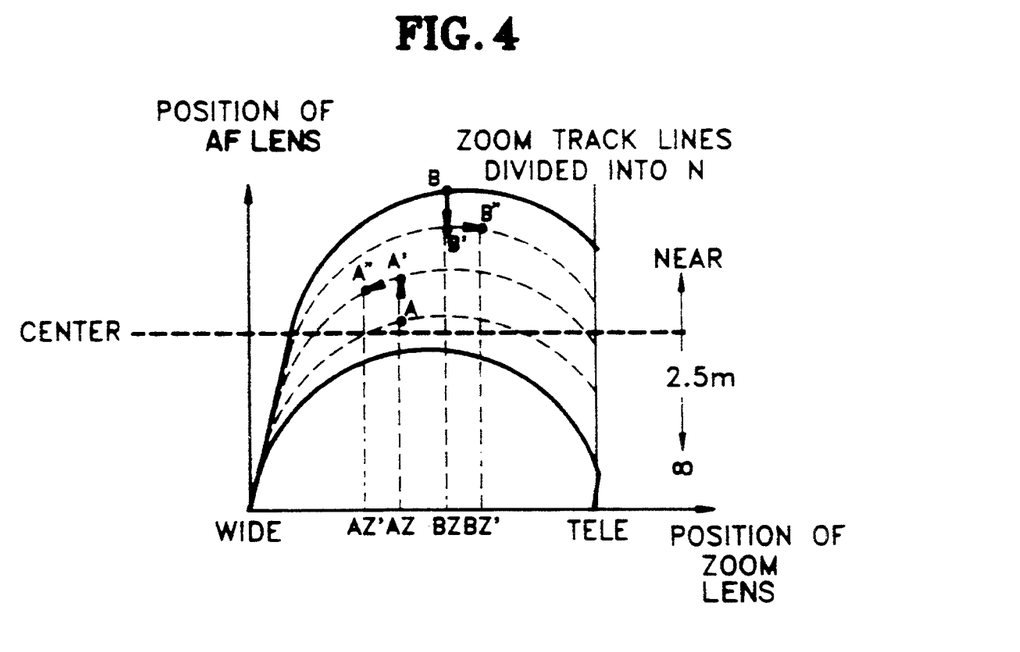
FIG. 4 is a zoom track graph showing the relationship between the zooming distance variation and a focus position.

ROM 70 stores data for a plurality of zoom track lines shown in FIG. 4. Preferably, the counted amount of zoom motor 91, corresponding to the position of zoom lens 11 and the counted value of AF motor 101, corresponding to the position of focus lens 12, indicates the optimal focus state. It will be noted that ROM 70 can be incorporated in the microcomputer. Zoom motor 91 and AF motor 101 advantageously can be provided as one of a stepping motor, a DC motor or a voice coil motor. When the stepping motor is used, the center of the lens preferably is discerned using a photosensor.

Advantageously, the zoom track lines showing the relationship between the zoom lens position and the position of the AF lens are stored in ROM 70 according to the distance (hereinafter referred to as distance of the object) between the camera and the object. The distance of the object is divided into a predetermined number N of zoom track lines. The specifications of the zoom track lines are determined according to the kind of lenses employed in the object tracking system. Therefore, for each zoom lens position and position of the AF lens, a corresponding zoom track line and its associated distance, i.e., the distance of the object, can be determined.

During step S4, using the initial zoom position detected during step S2 and the initial object distance detected by the counted value (hereinafter referred to as the initial focus position count) of the stepping motor used for AF motor 101, which shows the focus position according to the initial zoom position during step S3, and knowing the dimensions of the CCD 14, the initial size of the viewed object advantageously can be calculated.

During step S5, it is determined whether the viewed size of the object has varied in response to either the movement of the object with respect to a fixed camera or the movement of the photographer with respect to a fixed object.

Preferably, the size variation of the viewed object is sensed by microcomputer 80 according to the variation of the maximum AF evaluation value output by AF processor 50. AF controllers for detecting this maximum value are disclosed, for example, in the article entitled "Novel Technologies for Automatic Focusing and White Balancing of Solid State Video Camera" by K. Hanma et al. in *IEEE Transactions on Consumer Electronics* (Vol. CE-29, No. 3, August 1983) and in Japanese Laid-open Patent No. Hei 2-114773, both of which are incorporated herein by reference for all purposes.

During step S6, when a size variation of the viewed object is present in the screen, i.e., when the object or photographer moves during step S5, AF processor 50 detects the optimal focusing state, and the counted value (hereinafter referred to as the present focus position count) of the AF motor, corresponding to the focus position in the optimal focusing state, is read out from ROM 70. Preferably, since the object distance indicated by a zoom track line corresponding to the present focus position count at the initial zoom position among the zoom track lines (FIG. 4) becomes the present distance of the object, microcomputer 80 detects the present distance of the object.

During step S7, the variation amount of the zoom position is detected using the initial object distance, the present object distance and the predetermined height of the CCD. It should be noted that the variation amount of the zoom position becomes the present focal length of the zoom lens, by which the initial size of the viewed object can be maintained corresponding to the size variation of the viewed object, as discussed in greater detail below.

The initial focus position count and the present focus position count corresponding to the size variation of a viewed object are then compared during step S8. If the present focus position count is greater than the initial focus position count, the present object distance has become shorter than the initial object distance, which indicates that the object has moved nearer, as shown in FIG. 4. Accordingly, step S9 is performed to drive zoom motor 91 in the WIDE direction so as to vary the zoom position by an amount equal to the zoom distance variation detected during step S7.

On the other hand, if the present focus position count is smaller than the initial focus position count, the present object distance has become greater than the initial object distance, which indicates that the object has moved farther away, as shown in FIG. 4. In this case, step S10 drives zoom motor 91 in the TELE direction, to again vary the zoom position by an amount equal to the zoom distance variation detected during step S7.

The automatic zooming operation of the present invention, which is adapted to the viewed size variation of a viewed object, will be described with reference to FIGS. 4, 5A–5C and 6.

First, as shown in FIG. 4, an object is photographed at a viewing angle in the optimally focused initial position A or B. Then, when the object distance is varied, the viewing angle is changed as shown in either FIG. 5B or FIG. 5C.

Figure 5A:
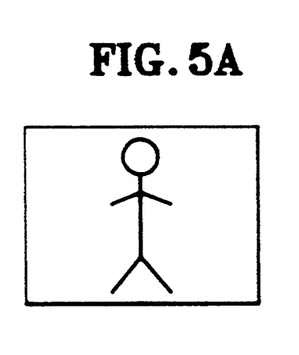
FIGS. 5A, 5B and 5C illustrate the distance variation of an object in a screen according to the variation of zooming position along the zoom track graph shown in FIG. 4.
Figure 5B:
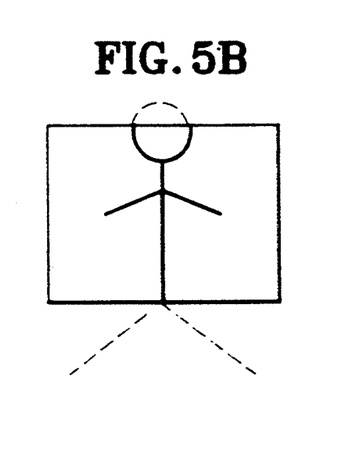
Figure 5C:
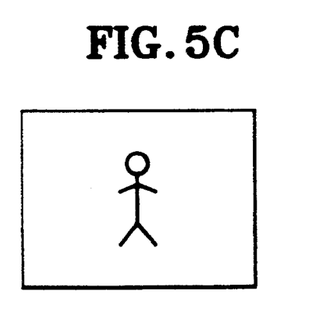

It should be noted that in the situation illustrated in FIG. 5B, the object is shifted from position A to position A' as shown in FIG. 4 while in the situation shown in FIG. 5C, the object is shifted from position B to position B'.

In order to prevent the viewing angle from becoming inappropriate, as in FIGS. 5B and 5C, the zoom position is varied at a determined zoom speed so that the initial viewing angle of FIG. 5A is maintained even if the object distance changes.

Specifically, when the object distance is varied from position A to position A' of FIG. 4, the viewing angle of the resulting picture is changed from that of FIG. 5A to that of FIG. 5B. It will be appreciated that a positional change in focusing lens 12 produces an overall change in the magnification of lens 10. Then, if the zoom lens is shifted from the initial zoom position AZ to the position AZ' (in the WIDE direction of FIG. 4), the viewing angle corresponding to FIG. 5B is adjusted back to that of FIG. 5A.

If the object distance is changed from B to B' of FIG. 4, the viewing angle of the resulting picture is changed from that of FIG. 5A to that of FIG. 5C. When the zoom lens moves from the initial zoom position BZ to position BZ' in the TELE direction, the viewing angle of FIG. 5C is adjusted to that of FIG. 5A.

Figure 6:
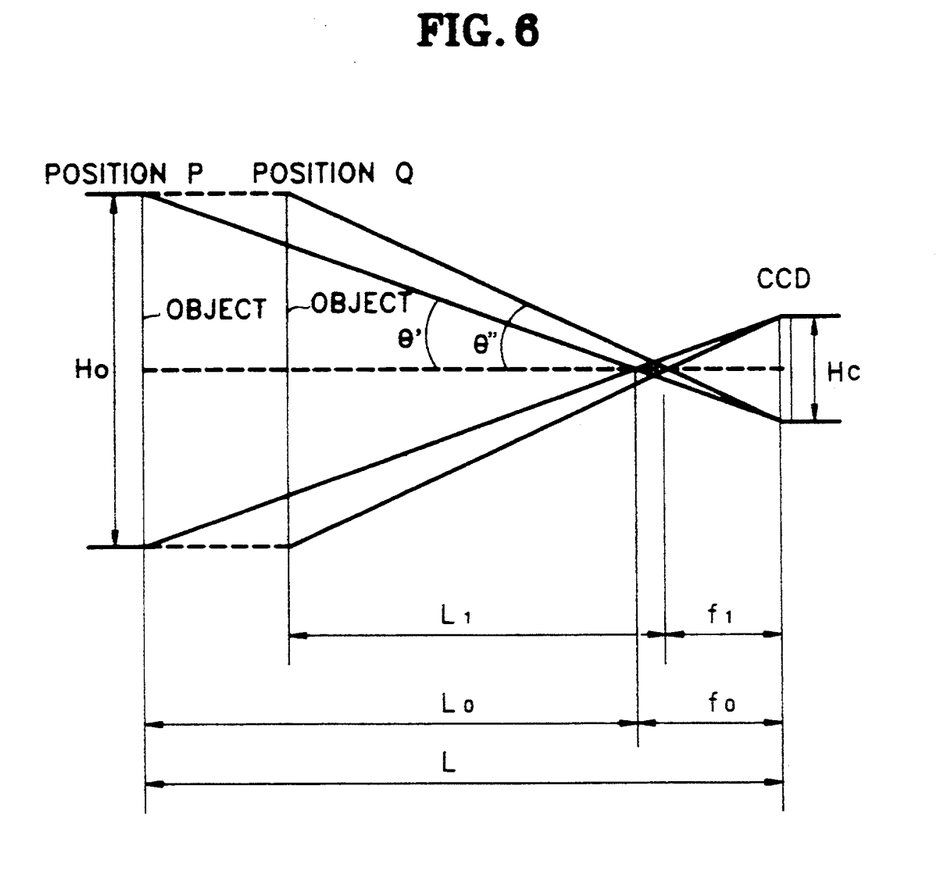
FIG. 6 illustrates the relationship among the focal length, the distance of the object and the angle of view, according to a distance variation of the object.

FIG. 6 illustrates the relationship among the focal length, the object distance and the viewing angle, as the object distance is changed, which will be described in reference to two cases.

Case 1: The object position is shifted from position P to position Q (that is, when the photographer becomes closer to the object and the zoom lens moves from A to A').

To find a focal length $f_1$ which indicates the variation degree of the zooming position, first, focal length $f_0$ is obtained by the zoom position signal detected from zoom encoder 20. The distance of an object L is obtained by reading out the optimal focus position data of the initial zoom position from ROM 70 which stores zoom track line data showing the relationship between the variation of the focus position and the variation of zoom position while the object distance is kept constant, and finding out a zoom track line corresponding to the read-out data. Accordingly, the distance which is indicated by the zoom track line is detected.

In FIG. 6, $H_0$ denotes the height (size) of an object, $H_C$ denotes the object's projected height on a CCD surface, $f_0$ and $f_1$ denote focal lengths at positions P and Q, respectively, and $L_0$ and $L_1$ denote distances of the object at positions P and Q. It is further assumed that $L \gg f$ and $L \neq L_0$ It should be noted that since the intention is to keep the object height $H_0$ fixed, $H_0$ is assumed to be constant when the object moves. The size of a camera screen is proportional to the height $H_C$ of CCD surface 14. $H_C$ has a constant value. Therefore, $$\tan \frac{\theta'}{2} = \frac{H_0/2}{L_0} = \frac{H_c/2}{f_0} \quad (1)$$

When the optimal focusing occurs at the initial position P of the object, the initial distance $L_0$ of a photographed object is known from the data stored in ROM 70 as described above.

According to Equation (1), $$H_0 = H_c \left( \frac{L_0}{f_0} \right) \quad (2)$$

Using Equation (2), the size (height) $H_0$ of the object is obtained.

It should be noted that to find the focal length $f_1$ at the present position Q of the object, $$\tan \frac{\theta'}{2} = \frac{H_0/2}{L_1} = \frac{H_c/2}{f_1} \quad (3)$$

It should be noted that the distance $L_1$ at the present position Q of the object is changed from A to A' of FIG. 4. When optimal focus position data according to the distance variation of the object is read out from ROM 70 to find a zoom track line corresponding to the data, $L_1$ is obtained from a distance which the zoom track line indicates.

Therefore, $f_1$ can be obtained using the expression:

$$f_1 = L_1 \left( \frac{H_c}{H_0} \right) \quad (4)$$

In other words, since zoom position value AZ' of FIG. 4 which is changed from the initial zoom position AZ can be obtained using the focal length $f_1$ at the present position Q of the object, an intended angle of view can be kept fixed.

Case 2: The object position is shifted from Q to P (that is, when the photographer becomes farther away from the object and the zoom lens moves from position B to position B').

It should be noted that since the movement distance BZ' of the zoom lens can be obtained in the same manner as that of Case 1, the intended viewing angle is kept constant.

The present invention can be efficiently utilized for cameras such as broadcast television cameras, home video cameras, etc.

As described above, in the object tracking method for automatic zooming and the apparatus therefor according to the present invention, using zoom track line data showing the relationship between zoom position and focus position, and varying the zooming speed while adapting to the distance variation of an object according to the movement of the object or that of a photographer so as to maintain a fixed distance between them, the object is automatically tracked so that an intended viewing angle is kept constant. Therefore, this invention is advantageous in acquiring a desired picture and is convenient to use during photographing.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An object tracking method for maintaining an image size constant during automatic zooming in a video camera having an internal memory for storing data defining a plurality of zoom track lines, each of said zoom track lines showing a relationship between distance variation of a zoom lens and a distance variation of a focus lens for a respective fixed distance, and a zoom lens operatively coupled to a zoom driving circuit having a variable picture-enlarging function and an AF control function for detecting an AF evaluation value using a value in which a focusing area corresponding to the distance variation of a photographed object input from a charge-coupled device (CCD) is integrated for a predetermined field period, wherein the zoom driving circuit further comprises a computer for receiving zoom track line data, receiving detected zoom and focus lens positions, calculating a required distance variation and speed of driving the zoom lens, and outputting to a zoom lens driving circuit data regarding zoom lens distance variation, so as to perform a zooming operation, said method comprising the steps of:

setting an automatic zooming mode for maintaining a constant size of said photographed object within a screen;

detecting a focal length corresponding to the initial zooming position;

reading out optimal focus position data corresponding to a detected initial zooming position from said internal memory so as to detect an object distance using one of said zoom track lines corresponding to the data;

determining an initial size of the viewed object using the detected initial zooming position, initial object distance and a vertical length of a CCD screen;

reading out optimal focus position data corresponding to the detected distance variation of said photographed object from said internal memory so as to detect present object distance using one of said zoom track lines corresponding to the data;

calculating the focal length of a zoom lens varying corresponding to the distance variation of said photographed object, using the detected initial object distance, the present object distance and the vertical length of the CCD screen;

comparing the detected initial object distance and the present object distance so as to determine the zooming direction;

calculating the variation amount of a zoom position and a zoom lens driving speed corresponding to calculated distance variation of said photographed object: and driving the zoom driving circuit in response to the zoom variation and zoom lens driving speed amount corresponding to the calculated varying focal length in the WIDE or TELE direction according to the result of the comparing step.

2. An object tracking method for maintaining the size of an image constant during an auto-zooming operation in a video camera, the camera having an AF control function in which optical information incident through a focus lens is converted into a video signal and the high-band component of the luminance signal of the video signal is used as automatic focusing evaluation value, a zooming function performed by a zoom lens and zoom driving circuit having a variable picture-enlarging function, wherein the zoom driving circuit further comprises a computer for receiving zoom track line data, receiving detected zoom and focus lens positions, calculating a required distance variation and speed of driving the zoom lens, and outputting to a zoom lens driving circuit data regarding zoom lens distance variation, said method comprises the steps of:

reading out from an internal memory data for a plurality of zoom track lines, each of said track lines showing the relationship between distance variation of the zoom lens and distance variation of the focus lens for a respective constant object distance;

pressing a key for setting an automatic zoom mode for keeping the angle of view of a photographed picture constant;

detecting position of the zoom lens after the automatic zoom mode is set;

detecting whether the position of a photographed object is varied based on the AF evaluation value;

calculating the variation amount of a zoom position and a zoom lens driving speed corresponding to detected distance variation of said photographed object, using the data read out for said zoom track lines during reading step; and variably controlling the zoom lens to the position corresponding to calculated zoom variation and zoom lens driving speed amount.

3. An object tracking method for maintaining an image size constant during automatic zooming in a video camera having an internal memory for storing data of a plurality of zoom track lines showing the relationship between the distance variation of a zoom lens and the distance variation of a focus lens while the object distance is kept constant, and a zoom lens and a zoom driving circuit having a variable picture-enlarging function, wherein the zoom driving circuit further comprises a computer for receiving zoom track line data, receiving detected zoom and focus lens positions, calculating a required distance variation and speed of driving the zoom lens, and outputting to a zoom lens driving circuit data regarding zoom lens distance variation, and an AF control function of detecting an AF evaluation value using a value in which a focusing area corresponding to the distance variation of a photographed object input from a CCD is integrated for a predetermined field period so as to perform a zooming operation, said method comprising the steps of:

(a) pressing a key for setting an automatic zoom mode in which the angle of view of said photographed object is kept constant;

(b) detecting an initial focal length corresponding to the position of the zoom lens after the automatic zoom mode is set;

(c) detecting an initial object distance corresponding to the initial focal length, using the data stored in said internal memory;

(d) calculating a viewed size of said photographed object, using the initial focal length, the object distance and a projected height on a CCD surface;

(e) detecting the distance variation of said photographed object, using the AF evaluation value;

(f) calculating present object distance corresponding to the detected distance variation of said photographed object, using the data stored in said internal memory;

(g) calculating the present focal length of the zoom lens and a zoom lens driving speed corresponding to the detected distance variation of said photographed object, using the present object distance, the projected height on the CCD surface and the initially viewed size of said photographed object;

(h) comparing the initial object distance and the present object distance;

(i) calculating the variation amount of a zoom position and a zoom lens driving speed corresponding to calculated distance variation of said photographed object; and (i) varying the focal length of the zoom lens in a WIDE or a TELE direction according to the compared result of step (i) in response to the output calculated during step (g).

4. An object tracking apparatus for automatic zooming in a video camera having a zooming function and an automatic focusing (AF) control function of detecting an AF evaluation value using a value in which a focusing area corresponding to the distance variation of a photographed object is integrated for a predetermined field period so as to control the automatic focusing, said apparatus comprising:

a memory for storing data of a plurality of zoom track lines, wherein each of said lines defines a relationship between distance variation of a zoom lens and distance variation of a focus lens fog a constant object distance;

zoom position detecting means for producing a zoom position signal corresponding to zoom lens position;

zoom lens variation calculating means for calculating a variation amount of a zooming position and a zoom lens driving speed corresponding to a distance variation of said photographed object, using the data stored in said memory and the zoom position signal the zoom driving circuit further comprises a computer for receiving zoom track line data, receiving detected zoom and focus lens positions, calculating a required distance variation and speed of driving the zoom lens, and outputting to a zoom lens driving circuit data regarding zoom lens distance variation; and zoom driving means for variably adjusting the zoom lens position in response to the output of said zoom lens variation calculating means.

* * * * *